US012076870B2

(12) United States Patent
Iaccarino

(10) Patent No.: US 12,076,870 B2
(45) Date of Patent: Sep. 3, 2024

(54) ATTACHMENT COMB, CUTTING HEAD AND HAIR CUTTING APPLIANCE

(71) Applicant: KONINKLIJKE PHILIPS N.V., Eindhoven (NL)

(72) Inventor: Luca Iaccarino, Groningen (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 73 days.

(21) Appl. No.: 17/747,007

(22) Filed: May 18, 2022

(65) Prior Publication Data

US 2022/0274271 A1 Sep. 1, 2022

Related U.S. Application Data

(63) Continuation of application No. 16/603,620, filed as application No. PCT/EP2018/059472 on Apr. 12, 2018, now Pat. No. 11,364,646.

(30) Foreign Application Priority Data

Apr. 14, 2017 (EP) .................................... 17166702

(51) Int. Cl.

*B26B 19/20* (2006.01)
*B26B 19/06* (2006.01)
*B26B 19/38* (2006.01)

(52) U.S. Cl.

CPC ............ *B26B 19/20* (2013.01); *B26B 19/063* (2013.01); *B26B 19/386* (2013.01)

(58) Field of Classification Search

CPC ....... B26B 19/06; B26B 19/063; B26B 19/20; B26B 19/38; B26B 19/3806; B26B 19/3813

(Continued)

(56) References Cited

U.S. PATENT DOCUMENTS

| | | | |
|---|---|---|---|
| 1,427,587 | A | 8/1922 | Fugitt |
| 1,628,421 | A | 5/1927 | Patenaude |

(Continued)

FOREIGN PATENT DOCUMENTS

| | | |
|---|---|---|
| EP | 2105267 A1 | 9/2009 |
| EP | 2875915 | 5/2015 |

(Continued)

OTHER PUBLICATIONS

International Search Report and Written Opinion Dated Jul. 9, 2018 for International Application No. PCT/EP2018/059472 Filed Apr. 12, 2018.

*Primary Examiner* — Jason Daniel Prone

(57) ABSTRACT

An attachment comb, particularly a skin protecting comb, for a blade set of a cutting head of a hair cutting appliance, the attachment comb including a supporting frame and comb teeth that are arranged in a series and that define a skin contact zone at a top side thereof. The teeth extend from the supporting frame and include rounded tips at frontal ends thereof. Additionally, the teeth are non-uniform along the series and include two outer lateral teeth that define lateral ends of the series, along with central teeth arranged therebetween. At the lateral teeth, a lateral teeth tip radius ($R_{tl}$) is present that is greater than a tip radius ($R_{tc}$) of the central teeth. Also described herein is corresponding a cutting head and hair cutting appliance.

16 Claims, 7 Drawing Sheets

(58) Field of Classification Search
USPC .................... 30/195–202, 233.5; D28/53, 54
See application file for complete search history.

(56) References Cited

U.S. PATENT DOCUMENTS

| | | | | | |
|---|---|---|---|---|---|
| 1,841,751 | A | | 1/1932 | McBride | |
| 1,997,096 | A | | 4/1935 | Mathew | |
| 2,481,097 | A | | 9/1949 | Fewins | |
| 2,882,595 | A | | 4/1959 | Hall | |
| D346,463 | S | * | 4/1994 | Nakashima | D28/53 |
| D417,931 | S | * | 12/1999 | Lebherz | D28/53 |
| 6,079,103 | A | | 6/2000 | Melton | |
| 6,427,337 | B1 | | 8/2002 | Burks | |
| D463,623 | S | * | 9/2002 | Kling | D28/54 |
| D512,185 | S | * | 11/2005 | Bokelman-Dumas | D28/53 |
| 7,051,442 | B2 | * | 5/2006 | McCambridge | B26B 19/3813 30/233 |
| D524,487 | S | * | 7/2006 | Seki | D28/54 |
| D530,858 | S | * | 10/2006 | Kling | D28/54 |
| 7,249,416 | B2 | * | 7/2007 | Yamaguchi | B26B 19/20 30/201 |
| D558,400 | S | * | 12/2007 | Micinilio | D28/54 |
| D574,557 | S | * | 8/2008 | Kling | D28/54 |
| D591,455 | S | * | 4/2009 | Micinilio | D28/54 |
| D591,907 | S | * | 5/2009 | Micinilio | D28/54 |
| D604,908 | S | * | 11/2009 | Kling | D28/53 |
| D617,497 | S | * | 6/2010 | Goodhead | D28/54 |
| D619,301 | S | * | 7/2010 | Wattam | D28/54 |
| D619,304 | S | * | 7/2010 | Shen | D28/54 |
| D620,196 | S | * | 7/2010 | Nicoll | D28/54 |
| 7,918,029 | B2 | * | 4/2011 | Melton | B26B 19/3813 30/200 |
| 7,921,566 | B2 | * | 4/2011 | Yamaguchi | B26B 19/20 30/200 |
| 8,122,896 | B2 | * | 2/2012 | Obermann | A45D 2/001 132/901 |
| 8,136,253 | B2 | * | 3/2012 | Zoot | B26B 19/3813 30/200 |
| D683,074 | S | * | 5/2013 | Julemont | D28/53 |
| D683,900 | S | * | 6/2013 | Julemont | D28/53 |
| 8,528,216 | B2 | * | 9/2013 | Melton | B26B 19/20 30/200 |
| D698,492 | S | * | 1/2014 | Grabes | D28/53 |
| 8,844,142 | B2 | * | 9/2014 | Kammer | B26B 19/20 30/201 |
| D718,496 | S | * | 11/2014 | Ino | D28/53 |
| D722,201 | S | * | 2/2015 | Boulanger | D28/54 |
| D753,879 | S | * | 4/2016 | Andersson | D28/54 |
| D754,399 | S | * | 4/2016 | Andersson | D28/54 |
| D754,400 | S | * | 4/2016 | Andersson | D28/54 |
| D756,565 | S | * | 5/2016 | Andersson | D28/54 |
| D800,388 | S | * | 10/2017 | Ino | D28/53 |
| 10,105,856 | B2 | * | 10/2018 | Tuijp | B26B 19/20 |
| 10,124,496 | B2 | * | 11/2018 | Nab | B26B 19/20 |
| 10,160,125 | B1 | * | 12/2018 | Skye | B26B 19/3813 |
| 10,293,500 | B1 | * | 5/2019 | Baker | B26B 19/20 |
| 10,456,936 | B2 | * | 10/2019 | Darwinkel | B26B 19/20 |
| D869,769 | S | * | 12/2019 | Zhang | D28/53 |
| D879,376 | S | * | 3/2020 | Zhang | D28/53 |
| D880,768 | S | * | 4/2020 | Zhang | D28/53 |
| D881,471 | S | * | 4/2020 | Zhang | D28/54 |
| 10,661,459 | B2 | * | 5/2020 | Vonk | B26B 19/20 |
| D891,702 | S | * | 7/2020 | Sanders | D28/54 |
| 10,730,197 | B2 | * | 8/2020 | Iaccarino | B26B 19/20 |
| 10,913,170 | B2 | * | 2/2021 | Phoon | B26B 19/3813 |
| 11,247,353 | B2 | * | 2/2022 | Phoon | B26B 19/20 |
| 11,364,646 | B2 | * | 6/2022 | Iaccarino | B26B 19/20 |
| 11,453,137 | B2 | * | 9/2022 | Godlieb | B26B 19/06 |
| 11,738,474 | B2 | * | 8/2023 | Van Veldhuizen | B26B 19/20 30/201 |
| 2004/0250428 | A1 | | 12/2004 | Melton | |
| 2008/0005908 | A1 | | 1/2008 | Melton | |
| 2008/0250644 | A1 | * | 10/2008 | Orloff | B26B 21/4018 30/233.5 |
| 2008/0295340 | A1 | * | 12/2008 | Carlucci | B26B 19/20 30/199 |
| 2008/0301948 | A1 | * | 12/2008 | Kostner | B26B 19/063 30/199 |
| 2011/0061243 | A1 | | 3/2011 | Smit | |
| 2013/0263457 | A1 | * | 10/2013 | Sobagaki | B26B 19/20 30/201 |
| 2016/0144518 | A1 | * | 5/2016 | Zijlstra | B26B 19/20 30/201 |
| 2018/0222068 | A1 | * | 8/2018 | Halmut | B26B 19/20 |
| 2018/0345510 | A1 | * | 12/2018 | Julemont | B26B 19/3813 |
| 2020/0094425 | A1 | * | 3/2020 | Iaccarino | B26B 19/20 |
| 2020/0230832 | A1 | * | 7/2020 | Danmola | B26B 19/3813 |
| 2020/0238547 | A1 | * | 7/2020 | Iaccarino | B26B 19/20 |
| 2020/0254636 | A1 | * | 8/2020 | Eijkelkamp | B26B 19/20 |
| 2021/0008739 | A1 | * | 1/2021 | Iaccarino | B26B 19/20 |
| 2021/0008740 | A1 | * | 1/2021 | Iaccarino | B26B 19/20 |
| 2021/0122070 | A1 | * | 4/2021 | Iaccarino | B26B 19/20 |
| 2022/0016792 | A1 | * | 1/2022 | Iaccarino | B26B 19/3813 |
| 2022/0040872 | A1 | * | 2/2022 | Pandis | B26B 19/20 |
| 2022/0072723 | A1 | * | 3/2022 | Toy | B26B 19/20 |
| 2023/0226706 | A1 | * | 7/2023 | Haagsma | B26B 19/20 30/201 |
| 2023/0286181 | A1 | * | 9/2023 | Al-Ansari | B26B 19/3806 30/201 |

FOREIGN PATENT DOCUMENTS

| | | |
|---|---|---|
| JP | S5558163 U | 4/1980 |
| JP | 2015128533 | 7/2015 |
| WO | 2013/150412 | 10/2013 |
| WO | 2016/134920 | 9/2016 |

* cited by examiner

ATTACHMENT COMB, CUTTING HEAD AND HAIR CUTTING APPLIANCE

CROSS REFERENCE TO RELATED APPLICATIONS

This application is a continuation of U.S. application Ser. No. 16/603,620 filed Oct. 8, 2019, published as US 2020/0130205 A1 on Apr. 30, 2020, now issued as U.S. Pat. No. 11,364,646, on Jun. 21, 2022, which is the U.S. National Phase application under 35 U.S.C. § 371 of International Application No. PCT/EP2018/059472 filed Apr. 12, 2018, published as WO 2018/189343 on Oct. 18, 2018, which claims the benefit of European Patent Application Number 17166702.5 filed Apr. 14, 2017. These applications are hereby incorporated by reference herein.

FIELD OF THE INVENTION

The present disclosure relates to an attachment comb for a blade set of a cutting head of a hair cutting appliance. More particularly, but not to be interpreted in a limiting sense, the present disclosure relates to a skin protecting comb for a body grooming appliance. In some embodiments, the present disclosure relates to improvements in attachment combs for multi-purpose hair cutting appliances. Further, the present disclosure relates to a cutting head for a hair cutting appliance, particularly for a grooming appliance, and to a hair cutting appliance that is arranged to be equipped with an attachment comb.

BACKGROUND OF THE INVENTION

WO 2013/150412 A1 discloses a stationary blade for a blade set of an electrically operated hair cutting appliance, the blade including a first wall and a second wall, each wall defining a first surface, a second surface facing away from the first surface, and a laterally extending leading edge defining a plurality of laterally spaced apart longitudinally extending projections, wherein the first surfaces of the first and second walls face each other, at least at their leading edges, while facing projections along the leading edges of the first and second walls are mutually connected at their tips to define a plurality of generally U-shaped teeth, and the first surfaces of the first and second walls define a laterally extending guide slot for a movable blade of said blade set between them, wherein the projections of the first wall have an average thickness that is less than an average thickness of the projections of the second wall.

Cutting appliances are well known in the art. Cutting appliances may particularly involve hair cutting appliances. In a more general context, the present disclosure addresses personal care appliances, particularly grooming appliances. Grooming appliances involve, but are not limited to, hair cutting appliances, particularly trimming appliances, shaving appliances, and combined (dual-purpose or multi-purpose) appliances.

Hair cutting appliances are used for cutting human hair, and occasionally animal hair. Hair cutting appliances may be used for cutting facial hair, particularly for shaving and/or for beard trimming. Further, cutting appliances are used for cutting (involving shaving and trimming) head hair and body hair.

In the trimming mode, the hair cutting appliance is typically equipped with a so-called spacing comb that is arranged to space away the blade set of the hair cutting appliance from the skin. Depending on the effective (offset) length of the spacing comb, a remaining hair length after the trimming operation may be defined.

Hair cutting appliances in the context of the present disclosure typically comprise a cutting head which may be referred to as processing head. At the cutting head, a blade set is provided, the blade set comprising a so-called stationary blade and a so-called movable blade. When the hair cutting appliance is operated, the movable blade is moved with respect to the stationary blade which may involve that respective cutting edges cooperate with one another to cut hair.

Hence, in the context of the present disclosure a stationary blade is arranged to be attached to the hair cutting appliance in such a way that a drive unit thereof is not cooperating with the stationary blade. Rather, the drive unit is typically coupled with the movable blade and arranged to set the movable blade into motion with respect to the stationary blade. Hence, the stationary blade may be, in some embodiments, fixedly attached to a housing of the hair cutting appliance.

However, in alternative embodiments, the stationary blade is arranged at the housing of the hair cutting appliance in a pivotable fashion. This may for instance enable a contour-following feature of the cutting head of the hair cutting appliance. Therefore, the term stationary blade, as used herein, shall not be interpreted in a limiting sense. Further, needless to say, when the hair cutting appliance as such is moved, also the stationary blade is moved. However, the stationary blade is not arranged to be actively actuated to cause a cutting action. Rather, the movable blade is arranged to be moved with respect to the stationary blade.

The stationary blade may also be referred to as guard blade. Typically, when the hair cutting appliance is operated to cut hair, the stationary blade is, at least in part, arranged between the movable blade and the hair or skin of the user. As used herein, the term user shall refer to a person or subject whose hair is being processed or cut. In other words, the user and the operator of the hair cutting appliance are not necessarily one and the same person. The term user may also involve a client at a hairdresser or barber shop.

In some aspects, the present disclosure relates to hair cutting appliances that are capable of both trimming and shaving operations. In this context, hair cutting appliances are known that incorporate a dual cutting arrangement including a first blade set that is suitably configured for trimming and a second blade set that is suitably configured for shaving. For instance, the shaving blade set may include a perforated foil that cooperates with a movable cutting element. Rather, the trimming blade set may include two blades that are respectively provided with teeth that cooperate with one another. In principle, the perforated foil that forms the stationary part of the shaving blade set may be much thinner than the stationary blade of a trimming blade set which, primarily for strength reasons, must be considerably thicker in conventional appliances.

The above WO 2013/150412 A1 proposes to provide the stationary blade with two walls, one of which is facing the skin of the user and the other one facing away from the user. The two walls are connected to one another and define, in a lateral view, a U-shaped profile that forms a guide slot for a movable cutter blade. Hence, the stationary blade is a double-walled blade. This has the advantage that the first wall may be arranged in a considerably thinner fashion as the second wall provides the stationary blade with sufficient strength. Therefore, such an arrangement is suitable for trimming, as respective teeth may be provided at the stationary blade and the movable blade. Further, the blade set is suitable for shaving as the effective thickness of the first wall of the stationary blade is considerably reduced.

US 2011/0061243 A1 discloses a comb for a hair trimming device comprising a base configured to secure the comb to a trimming device, primary teeth configured to provide a fixed distance from a cutting edge of the trimming device, and secondary teeth configured to manipulate hair to a predetermined orientation relative to the cutting edge, wherein the secondary teeth are disposed between the primary teeth, and wherein the secondary teeth are spaced closer together than the primary teeth.

US 2008/0005908 A1 discloses an attachment comb for a hair clipper comprising a base portion constructed and arranged for releasably engaging the hair clipper, and a plurality of teeth extending from said base portion, each of said teeth including a body portion defined between an upper peripheral edge and a lower peripheral edge, a proximal end adjacent said base portion and a distal end at an opposite end thereof, wherein said body portion is provided with at least one formation for retaining hair in the comb prior to cutting, and wherein said plurality of teeth includes a plurality of full teeth and a plurality of intermediate teeth, wherein said plurality of full teeth includes a pair of outer teeth, each of said full, intermediate and outer teeth having a distinct configuration, said body portion of said intermediate teeth having a reduced volume of said body portion compared to said full teeth.

U.S. Pat. No. 2,481,097 discloses a hair guiding attachment for hair clippers having a series of teeth. The lateral teeth of this attachment having a different width when seen from a top view as in FIG. 2 of the drawings to this patent publication.

U.S. Pat. No. 2,882,595 discloses a comb attached to a hair clipper accessory in the form of a frame comprising arms. The comb having a series of teeth. The lateral teeth of this attachment having a different width when seen from a top view as in FIGS. 2 and 3 of the drawings to this patent publication.

U.S. Pat. No. 1,628,421 disclose an attachment for a hair clipper having curved teeth. The lateral teeth of this attachment are having their terminals curved over upon themselves, the other teeth don't.

Further, hair cutting appliances are known which utilize blade sets that are attached thereto in a hinged or pivotable manner, as disclosed in EP 2 875 915A1, for instance. In other words, the blade set may swivel with respect to the housing of the hair cutting appliance so as to align with a currently processed skin contour. This may significantly increase the shaving capability of the hair cutting appliance, particularly in hard-to-reach areas. In case it is desired to maintain the swiveling or pivoting capability of the blade set when a comb is attached thereto, account should be taken of retaining forces, actuation forces and further implications that may arise from a direct attachment of the comb.

It has been observed, however, that for some applications, there is still room for improvement in the geometry and overall design of attachment combs, particularly to meet a beneficial trade-off between cutting performance, hair lifting behavior, skin protecting and ease of operation. More particularly, it has been observed that whenever the teeth of a comb are optimized for certain requirements, it is quite likely that the comb's performance is worsened when it comes to other specific requirements.

Further, grooming appliances are nowadays often used not only for cutting facial hair and/or head hair, but also for total body grooming applications. This may involve grooming operations in sensitive skin regions, for instance in the armpit and/or even in the genital area. In those areas, the skin is relatively soft and vulnerable to irritations and/or even cutting damages.

When designing attachment combs, basically opposing design criteria have to be met. This may involve, for instance, comfort, hair lifting performance/hair manipulating performance, skin doming, operation speed, smooth handling, operational force, and skin protection. Further, hair and debris removal capacity may be a considerable factor.

Consequently, there is still a need for improvement in hair cutting appliances. This may particularly involve user comfort related aspects, safety related aspects and performance related aspects.

SUMMARY OF THE INVENTION

It is an object of the present disclosure to provide an attachment comb that is suitably configured for hair cutting operations and that can be attached to and detached from a blade set of a hair cutting appliance. More particularly, it is desired to provide an attachment comb that is operable as a skin protecting comb and that facilitates body grooming procedures, particularly in rather sensitive skin regions.

Preferably, the attachment comb is designed to provide a beneficial trade-off between design criteria such as comfort, safety, speed and operation effort. It would be desirable to present an attachment comb that is designed to enable an optimized trimming/shaving speed, and an improved hair cutting performance, while maintaining a certain level of comfort and safety.

Preferably, the present disclosure addresses at least some drawbacks inherent in known hair cutting appliances and attachment combs as discussed above. It is further preferred to provide a cutting head for a hair cutting appliance and a hair cutting appliance that are arranged to be equipped with an attachment comb, particularly with a skin protecting comb for total body grooming applications.

A further object of the present disclosure is to provide a set of appropriate parameters for the toothing of an attachment comb that ensures a balanced operation, while considering performance and safety as well as comfort.

In a first aspect of the present disclosure an attachment comb, particularly a skin protecting comb, for a blade set of a cutting head of a hair cutting appliance, the attachment comb comprising:

- a supporting frame,
- a plurality of comb teeth that are arranged in a series and that define a skin contact zone at a top side thereof,
- wherein the teeth extend from the supporting frame and comprise rounded tips at frontal ends thereof,
- wherein the teeth are non-uniform along the series and comprise two outer lateral teeth that define lateral ends of the series having rounded lateral tooth tips, and central teeth having rounded central teeth tips arranged therebetween,
- wherein the lateral teeth comprise a lateral teeth tip radius $R_{tl}$ corresponding to the curvature of the rounded lateral tooth tips when the lateral teeth are viewed in a side view perpendicular to the extension direction of the series of teeth,
- wherein the central teeth comprise a central teeth tip radius $R_{tc}$ corresponding to the curvature of the rounded central tooth tips when the central teeth are viewed in a side view perpendicular to the extension direction of the series of teeth, and wherein at the lateral teeth a lateral teeth tip radius $R_{tl}$ is present that is greater than a tip radius $R_{tc}$ of the central teeth.

In another, more general aspect of the present disclosure an attachment comb, particularly a skin protecting comb, for a blade set of a cutting head of a hair cutting appliance is presented, the attachment comb comprising:

a supporting frame, a plurality of comb teeth that are arranged in a series and that define a skin contact zone at a top side thereof, wherein the teeth extend from the supporting frame and comprise rounded tips at frontal ends thereof, wherein the teeth are non-uniform along the series and comprise two outer lateral teeth that define lateral ends of the series, and central teeth arranged therebetween, and wherein at the lateral teeth a lateral teeth tip radius $R_{tl}$ is present that is greater than a tip radius $R_{tc}$ of the central teeth.

Major aspects of the present disclosure are the insight that particularly for total body grooming applications, safety and performance may be improved when an attachment comb is provided that comprises a non-uniform arrangement of teeth. More particularly, the lateral teeth that define lateral ends of the series of teeth and the central teeth interposed therebetween are differently shaped. Hence, at least two distinct tooth types are present. It has been observed that significant improvements may be achieved when the tip radius of the lateral teeth is significantly larger than the tip radius of the central teeth. As used herein, the tip radius of the teeth is visible as an outer edge in a side/lateral view of the attachment comb, wherein a respective main extension direction/plane of the teeth is parallel to the side view plane.

Defined in other words, in an attachment comb according to the present invention the teeth are non-uniform along the series and comprise two outer lateral teeth that define lateral ends of the series having rounded lateral tooth tips, and central teeth having rounded central teeth tips arranged therebetween. The lateral teeth comprise a lateral teeth tip radius ($R_{tl}$) corresponding to the curvature of the rounded lateral tooth tips when the lateral teeth are viewed in a side view perpendicular to the extension direction of the series of comb teeth. The central teeth comprise a central teeth tip radius ($R_{tc}$) corresponding to the curvature of the rounded central tooth tips when the central teeth are viewed in a side view perpendicular to the extension direction of the series of comb teeth. The lateral teeth tip radius $R_{tl}$ being greater than the tip radius $R_{tc}$ of the central teeth.

Generally, the teeth of the attachment comb may be regarded as "extensions" of the teeth of the blade set of the appliance, when the attachment comb is attached thereto. The attachment comb teeth may condition the hair that is to be processed by the blade set. Hence, the attachment comb may be arranged to lift hairs in front of the blade set so that the hairs are in an appropriate hair cutting orientation when cutting edges of the blade set reach the conditioned hair.

Generally, the attachment comb may involve a spacing function, i.e. defining an offset between the skin level and the blade set that results in a respective trimming length. However, the attachment comb may also be configured for shaving operations, wherein the main purpose of the comb is not to provide a spacing between the blade set and the skin level, but to improve performance, comfort and safety of the shaving operation. This may be beneficial for gentle and smooth body grooming/shaving applications, for instance in genital areas and/or in the armpits.

Over the human/animal body, different hair types are present, for instance on the scalp, in the face, at the body limbs, in the armpits, in the genital area, etc. Hence, it may be beneficial to provide an attachment comb even for shaving or low-level trimming applications to set up the hair immediately prior to the cutting operation. In this way, one and the same blade set may be operable for shaving applications in different body regions, for instance at the face, at the limbs, at the chest and/or the back, and even in the genital area.

Providing differently shaped tip radii at the comb teeth has a positive effect on the operational force/movement force and the skin safety. This applies in particular when the tip radius of the lateral teeth is greater than the tip radius of the central teeth.

In some respect, the tips of the lateral teeth are outwardly offset from the tips of the central teeth, i.e. offset in the vertical and the longitudinal direction to the top and the front. Hence, when the blade set that is equipped with the attachment comb is moved along the skin, a skin region to be processed is first contacted by the tips of the lateral teeth and, subsequently, by the tips of the central teeth that are arranged therebetween. Hence, the lateral teeth form a lateral support for the attachment comb which has the effect that for the tips of the central teeth, the contact force is reduced.

As a consequence, despite of being provided with tips having a smaller tip radius than the tips of the lateral teeth, the central teeth do not dip deep into the skin, as the main support is provided by the lateral teeth tips. Consequently, hair lifting, processing speed, and required operating force may be improved while maintaining skin comfort and safety.

In an exemplary embodiment of the attachment comb, at the central teeth a uniform central teeth tip radius $R_{tc}$ is present that is, seen in side view, smaller than the lateral teeth tip radius $R_{tl}$. That is, the lateral teeth may act as supporting teeth as due to their increased contact surface they may bear greater loads. As a result, the central teeth are in some respect relieved, involving a reduced tendency to dip into the skin.

In a further exemplary embodiment of the attachment comb, the lateral teeth tip radius $R_{tl}$ is in the range of 1.0 mm to 2.5 mm (millimeter), preferably in a range of 1.2 mm to 1.8 mm, more preferably at least 1.5 mm, wherein the central tip radius $R_{tc}$ is in the range of 0.25 mm to 0.8 mm, preferably in the range of 0.35 mm to 0.7 mm. The above values and ranges apply particularly as seen in side view. Forming the tips of the lateral teeth somewhat blunter, and forming the tips of the central teeth more pointy improves the overall cutting performance. In certain embodiments, the lateral teeth tip radius $R_{tl}$ is only slightly greater than the central tip radius $R_{tc}$.

Generally, in some embodiments, the lateral teeth tip radius $R_{tl}$ is the same for all the lateral teeth, and the central tip radius $R_{tc}$ is the same for all the central teeth.

In yet another exemplary embodiment of the attachment comb, in the vertical direction, the lateral teeth protrude beyond the central teeth. Hence, also on the vertical direction, an offset between the lateral teeth and the central teeth may be present.

In a further exemplary embodiment of the attachment comb, in the vertical direction, the lateral teeth protrude beyond the central teeth towards the top side, wherein the lateral teeth tips are upwardly offset with respect to the central teeth tips. The offset $o_{top}$ between the lateral teeth and the central teeth tips in the vertical direction may be in the range between 0.7 mm to 1.2 mm, preferably at about 0.9 mm.

In another exemplary embodiment, in the longitudinal direction, the lateral teeth protrude beyond the central teeth, wherein the lateral teeth tips are forwardly offset with respect to the central tips. The longitudinal offset $o_{tl}$ may be in the range between 0.1 mm to 1.5 mm, preferably between 0.1 mm to 0.3 mm, more preferably at about 0.2 mm in the longitudinal direction.

In other words, a longitudinal extension $l_{tl}$ of the lateral teeth is greater than or equal to a longitudinal extension $l_{tc}$ of the central teeth, wherein the longitudinal extension $l_{tl}$ of the lateral teeth is preferably 0.1 mm to 1.5 mm, more preferably between 0.1 mm to 0.3 mm greater than the longitudinal extension $l_{tc}$ of the central teeth.

In accordance with at least some exemplary embodiments, the outer shape of the lateral teeth is offset from the outer shape of the central teeth both in the horizontal direction and the vertical direction. The lateral teeth protrude beyond the central teeth both in the horizontal direction and the vertical direction.

In yet another exemplary embodiment of the attachment comb, a width $w_{tl}$ of the lateral teeth is greater than a width $w_{tc}$ of the central teeth. In some embodiments, a ratio between the width $w_{tl}$ of the lateral teeth and the width $w_{tc}$ of the central teeth is between 1.25 and 1.5. More generally, in further embodiments, the ratio between the width $w_{tl}$ of the lateral teeth and the width $w_{tc}$ of the central teeth is in a range between 1.0 (more particularly greater than 1.0, or >1.0) and 1.5. Hence, in certain embodiments, the width $w_{tl}$ of the lateral teeth and the width $w_{tc}$ are basically the same or at least considerably similar.

Generally, the term width corresponds to the lateral extension of the central teeth and the lateral teeth. In other words, the width of the teeth corresponds to the respective thickness. For convenience, the above expressions may represent a mean width of the teeth as for instance due to draft angles the width is not necessarily constant over the longitudinal and/or vertical extension of the teeth.

In some embodiments, a relationship between the ratio of the tip radii and the ratio of the widths of the lateral teeth and the central teeth is present that is reflected in a general design rule. Basically, as the tip radius of the lateral teeth approaches the tip radius of the central teeth, it may be beneficial to increase the ratio (difference) between the width of the lateral teeth and the width of the central teeth. Conversely, when the width of the lateral teeth approaches the width of the central teeth approaches, it may be beneficial to increase the lateral teeth tip radius with respect to the central teeth tip radius.

In yet another exemplary embodiment of the attachment comb, tooth slots are formed between the teeth of the series, wherein the tooth slots have a width $w_{ts}$ of no more than 1.5 mm, preferably of no more than 1.2 mm. A uniform width of the tooth slots may apply to all the comb teeth of the series of teeth, i.e. also involving the width of outer lateral tooth slots between lateral teeth and central teeth. However, this does not exclude alternative embodiments that implement differently sized tooth slots at the different teeth types. Generally, the width of the tooth slots may also be referred to as tooth spacing.

In another exemplary arrangement of the attachment comb, the teeth comprise a rear side facing the blade set in the mounted state, and a front side that is opposite to the rear side, wherein the top side where the skin contact zone is formed connects the front side and the rear side, wherein the tips are formed at a transition between the front side and the top side, wherein the tips are convex, and wherein at the front side a concave curvature adjoins the tips. The above applies particularly in side view. In other words, a frontal outer edge of the teeth may be S-shaped in side view. The top side of the teeth may be generally straight-lined or planar.

In another exemplary embodiment of the attachment comb, the supporting frame forms opposite lateral walls, wherein lateral lugs extend inwardly from the lateral walls to contact top side lateral end bars of a stationary blade of the blade set, wherein at a bottom side of the attachment comb a linking bar extends between the lateral walls, and wherein the teeth basically extend in the vertical direction from the linking bar. In other words, the linking bar forms a bottom end of the attachment comb from which the teeth extend to a top end thereof. Further, two opposite linking bars may be present that respectively connect opposite ends of the lateral walls. Hence, the two linking bars in accordance with this embodiment are spaced away from one another in the longitudinal direction.

In yet another exemplary embodiment of the attachment comb, the lateral walls and the lateral teeth form snap-on mounting features that cooperate for releasably attaching the attachment comb to the blade set. In other words, the lateral walls and the lateral teeth may jointly form a top abutment zone and a bottom abutment zone for the blade set, particularly for the stationary blade thereof. Any of the lateral walls and the lateral teeth may be at least slightly deflectable to enable an insertion of the blade set. In other words, due to the snap-on mounting features, the attachment comb may fit on the blade set.

In accordance with the above exemplary embodiment, the attachment comb may be arranged to be attached to a pivotably supported blade set. Hence, it is not necessary to attach the attachment comb directly to a housing of the hair cutting appliance. As a result, a contour following feature of the hair cutting appliance may be maintained. This may further improve the hair cutting performance.

In yet another exemplary embodiment, the attachment comb is operable in a minimized offset configuration, wherein, in the mounted state, the skin contact zone formed at the top side of the attachment comb is upwardly offset from a top surface of the stationary blade of the blade set. Preferably, the offset value $o_c$ is fairly small and in the range between 0.05 mm to 0.2 mm. A slight offset between the stationary blade top surface and the skin contact zone of the attachment comb improves the skin protection and the overall operational safety. The above embodiment may be implemented when the attachment comb is attached to the blade set in an operating state. The above does not exclude embodiments wherein the offset value $o_c$ is basically zero (~0.0 mm), i.e. not distinct or only an insignificant offset is present. Hence, in a more general context, the offset value $o_c$ is in the range of 0.0 mm (more particularly at least slightly greater than 0.0 mm, or >0.0 mm) to 0.4 mm.

Further, when the attachment comb is arranged as a spacing comb, the offset value $o_c$ may be much greater, e.g. at 1.3 mm, 3.0 mm, 6.0 mm, 9.0 mm, etc., resulting in a respective offset between the skin and the blade set for trimming purposes.

In another exemplary embodiment, the attachment comb comprises a first series of comb teeth and a second series of comb teeth that is opposite to the first series of comb teeth, wherein the first series of comb teeth and the second series of comb teeth define therebetween a recess for a blade set of a hair cutting appliance. The recess may also be referred to as a seat or a window for the blade set. In the attached state of the attachment comb, the blade set is accommodated in the recess. The teeth of the first series and the second series of teeth may define a longitudinal position of the blade set in the recess. The lateral walls of the attachment comb may define a lateral position of the blade set. The mounting features of the lateral walls and the lateral teeth may define a vertical position of the blade set in the recess.

In a further aspect of the present disclosure there is presented a cutting head for a hair cutting appliance, particularly an electrically operated grooming appliance, the cutting head comprising:

a blade set comprising a stationary blade and a movable blade, the stationary blade and the movable blade comprising at least one toothed leading edge jointly defined by respective teeth of the stationary blade and the movable blade, the teeth of the stationary blade and the movable blade basically extending in a longitudinal direction, wherein the stationary blade further comprises a top surface, particularly at the teeth thereof, the top surface being arranged to face a user's skin, when in operation, and an attachment comb in accordance with at least one embodiment as discussed herein, wherein the attachment comb is releasably mounted to the blade set.

In an exemplary embodiment, the cutting head further comprises a swiveling mechanism that couples the blade set and a housing portion, wherein the attachment comb is arranged, in a mounted state, to be pivoted together with the blade set with respect to the housing portion. Hence, a contour-following feature of the cutting head may be maintained even when the attachment comb is attached.

In yet another aspect of the present disclosure there is presented a hair cutting appliance, particularly a grooming appliance, the appliance comprising a housing and a cutting head arranged at a top end of the housing, wherein at the cutting head a blade set comprising a stationary blade and a movable blade is provided, and an attachment comb in accordance with at least one embodiment as described herein, wherein the attachment comb is arranged to be releasably mounted to the blade set.

In yet another aspect of the present disclosure, a hair cutting appliance is presented, particularly an electrically operated body grooming appliance, the hair cutting appliance being arranged to be moved through hair in a moving direction to cut hair, wherein the hair cutting appliance comprises a blade set, particularly a pivotably mounted blade set, and an attachment comb in accordance with at least some aspects of the present disclosure.

In still another aspect of the present disclosure, a set of attachment combs is provided that are arranged in accordance with at least one aspect of the present disclosure, particularly in terms of their teeth design and features, and that provide distinct defined orientations and/or relative positions between the blade set and the to-be-processed skin surface so as to enable shaving/trimming operations at different lengths.

BRIEF DESCRIPTION OF THE DRAWINGS

These and other aspects of the disclosure will be apparent from and elucidated with reference to the embodiments described hereinafter. In the following drawings

DETAILED DESCRIPTION OF THE EMBODIMENTS

Figure 1:
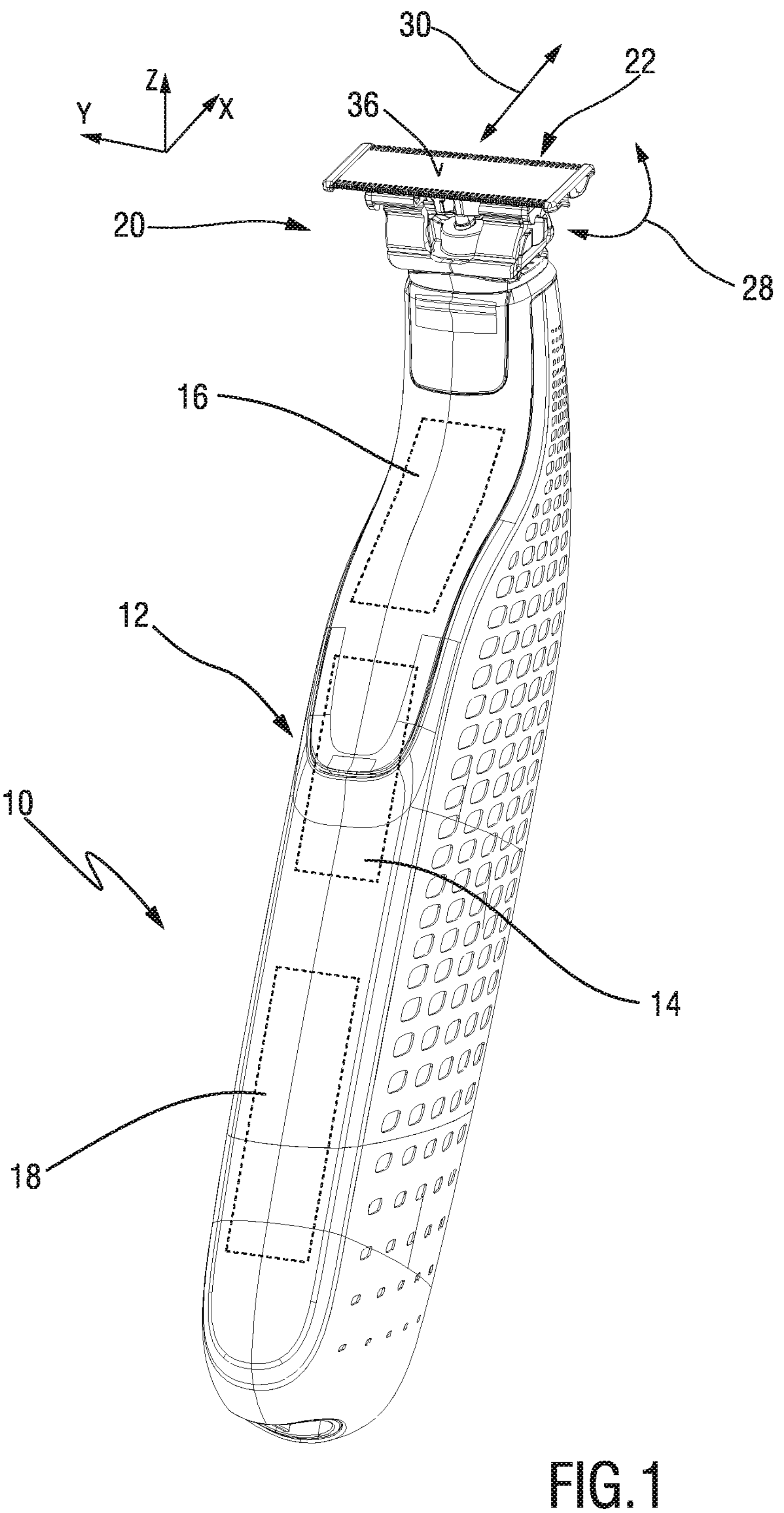
FIG. 1 shows a schematic perspective view of an exemplary hair cutting appliance that may be equipped with an exemplary embodiment of an attachment comb in accordance with the present disclosure.

FIG. 1 schematically illustrates, in a simplified perspective view, an exemplary embodiment of the hair cutting appliance 10, particularly an electric hair cutting appliance. The hair cutting appliance 10 may comprise a housing or, more particularly, a housing portion 12, a motor indicated by a dashed block 14 in the housing portion 12, and a drive mechanism or drive train indicated by a dashed block 16 in the housing portion 12. For powering the motor 14, at least in some embodiments of the hair cutting appliance 10, an electrical battery, indicated by a dashed block 18 in the housing portion 12, may be provided, such as, for instance, a rechargeable battery, a replaceable battery, etc. However, in some embodiments, the cutting appliance 10 may be further provided with a power cable for connecting a power supply. A power supply connector may be provided in addition or in the alternative to the (internal) electric battery 18.

Figure 2:
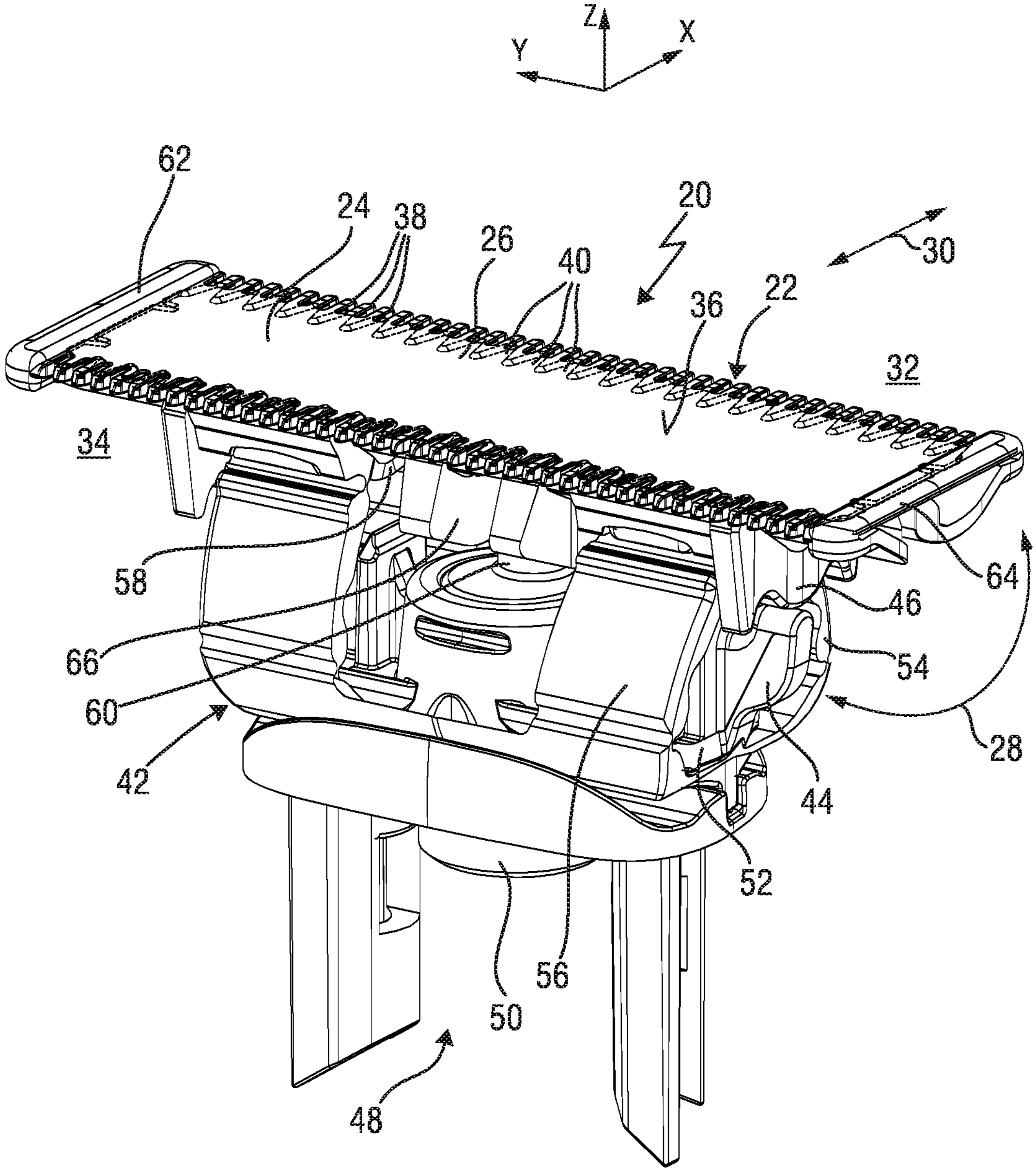
FIG. 2 shows a perspective top view of a blade set for a cutting head for a hair cutting appliance.

The hair cutting appliance 10 may further comprise a cutting head 20. At the cutting head 20, a blade set 22 may be attached to the hair cutting appliance 10. The blade set 22 may be driven by the motor 14 via the drive mechanism or drive train 16 to enable a cutting motion. FIG. 2 shows a perspective top view of a blade set 22 that may be incorporated in the hair cutting appliance 10 illustrated in FIG. 1. The cutting motion may generally be regarded as a relative motion between a stationary blade and a movable blade (cutter blade) which will be further described and discussed hereinafter. Hence, the terms stationary blade (guard blade) and movable blade (cutter blade) shall not be interpreted in a limiting sense.

Generally, a user may grasp, hold and manually guide the cutting appliance 10 through hair in a moving direction 30 to cut hair. The cutting appliance 10 may be regarded as a hand-guided or hand-operated electrically powered device. Furthermore, the cutting head 20 or, more particularly, the blade set 22 can be connected to the housing portion 12 of the cutting appliance 10 in a pivotable manner, refer to the curved double-arrow indicated by reference numeral 28 in FIG. 1. In some applications, the cutting appliance 10 can be moved along skin to cut hair growing at the skin. When cutting hair closely to the skin, basically a shaving operation can be performed aiming at cutting or chopping hair at the level of the skin. However, also clipping (or trimming) operations may be envisaged, wherein the cutting head 20 comprising the blade set 22 is passed along a path at a desired distance relative to the skin.

When being guided through hair, the cutting appliance 10 including the blade set 22 is typically moved along a common moving direction which is indicated by the reference numeral 30 in FIG. 1. It is worth mentioning in this connection that, given that the hair cutting appliance 10 is typically manually guided and moved, the moving direction 30 thus not necessarily has to be construed as a precise geometric reference having a fixed definition and relation with respect to the orientation of the hair cutting appliance 10 and its cutting head 20. That is, an overall orientation of the hair cutting appliance 10 with respect to the to-be-cut hair at the skin may be construed as somewhat unsteady. However, for illustrative purposes, it may be fairly assumed that the (imaginary) moving direction 30 is parallel (or generally parallel) to a main central plane of a coordinate system which may serve in the following as a means for describing structural feature of the hair cutting appliance 10. The X-axis and the Y-axis define a horizontal plane.

In some Figures shown herein, exemplary coordinate systems are shown for illustrative purposes. As used herein, an X-axis is assigned to a longitudinal direction. Further, a Y-axis is assigned to a lateral direction. Accordingly, a Z-axis is assigned to a vertical (height) direction. Respective associations of the axes/directions X, Y, Z with respective features and extensions of the components illustrated can be derived from those Figures. The X-axis and the Y-axis jointly define a horizontal plane. It should be understood that the coordinate system X, Y, Z is primarily provided for illustrative purposes and not intended to limit the scope of the disclosure. This involves that the skilled person may readily convert and transform the coordinate system when being confronted with further embodiments, illustrations and deviating view orientations. Also a conversation of Cartesian coordinate systems into polar coordinate system may be envisaged, particularly in the context of a circular or curved blade set.

The blade set 22 shown in more detail in FIG. 2 comprises a stationary blade 24 and a movable blade 26 that may be moved with respect to the stationary blade 24 in a reciprocating motion. The stationary blade 24 and the movable blade 26 may jointly define at least one toothed leading edge 32, 34, preferably a first toothed leading edge 32 and a second toothed leading edge 34. The first toothed leading edge 32 and the second toothed leading edge 34 are arranged in parallel fashion and facing away from each other. The movable blade 26 is indicated in FIG. 2 in a dashed representation. The movable blade 26 may be driven by a drive shaft 50 in a reciprocating manner. Consequently, the movable blade 26 and the stationary blade 24 may be reciprocatingly moved with respect to each other and therefore cooperate to cut hairs that enter slots between teeth 38 of the stationary blade 24 and teeth 40 of the movable blade 26 at the respective leading edges 32, 34 when the hair cutting appliance 10 is moved through hair in the moving direction 30. At the drive shaft 50, a driving pin 60 is formed in an off-center fashion. Hence, when the drive shaft 50 rotates, the driving pin 60 revolves about a driving axis to actuate an entrainer unit 66 that is coupled to the movable blade 26 by a driving bridge 68 (shown in FIG. 6).

In FIG. 2, a top surface of the stationary blade 24 that is facing the skin of the user when the appliance 10 is in operation is indicated by 36. In some embodiments, the top surface 36 is parallel to the horizontal plane defined by the X-axis and the Y-axis.

The stationary blade 24 may be arranged as a guard for the movable blade 26. It is particularly preferred that the stationary blade 24 comprises a first wall portion and a secondary wall portion which are at least partially spaced from each other such that a guide slot for the movable blade 26 is defined therebetween, refer also to the cross-sectional representation of the blade set 22 in FIG. 6. As a consequence, the stationary blade 24 may also cover the movable blade 26 at the at least one toothed leading edge 32, 34.

As already indicated above, the blade set 22 may be particularly suited for shaving and trimming operations. Shaving performance and trimming performance may be further improved when the blade set 22 is capable of following an actual skin contour. Consequently, it is particularly preferred that the blade set 22 is attachable to the housing portion 12 of the hair cutting appliance 10 in a pivotable fashion. A swiveling mechanism is indicated in FIG. 2 by reference numeral 42. The blade set 22 is attached to the swiveling mechanism 42. The swiveling mechanism 42 may form a part of the cutting head 20 that is interposed between the blade set 22 and the housing portion 12. The swiveling mechanism 42 may define a pivot or, rather, a virtual pivot for the blade set 22, refer to the curved double-arrow 28 in FIGS. 1 and 2.

So as to define a maximum swiveling angle of the blade set 22 with respect to the housing portion 12, the swiveling mechanism 42 may comprise a limit stop 44 that may cooperate with a contact surface 46 to define an allowed range of the swiveling motion. By way of example, the swiveling mechanism 42 may be arranged as a four-bar-linkage mechanism. In this embodiment, the swiveling mechanism 42 comprises a base link 52 that may be attached to the housing portion 12. A first side link 54 and a second side link 56 may be coupled to the base link 52. At a top end thereof, the swiveling mechanism 42 may comprise a top link 58 that connects the first side link 54 and the second side link 56. Between the respective links 52, 54, 56, 58 hinges may be provided, particularly living hinges, that enable relative rotation between neighboring links and thus the overall pivoting motion.

Generally, at least in some embodiments, the cutting head 20 may be regarded as a replaceable and/or a detachable cutting head. To this end, the cutting 20 may comprise an attachment interface 48 which is arranged to engage a respective receiving interface at the housing portion 12 of the hair cutting appliance 10. Particularly, the cutting head 20 may be arranged as a plug-in cutting head 20. As already indicated above, the blade set 22, particularly the movable blade 26 thereof, may be coupled to the drive shaft 50. The drive shaft 50 may comprise an eccentric portion (pin 60) that may revolve about a longitudinal axis of the drive shaft 50. Consequently, an eccentric drive mechanism 16 may be provided for driving the movable blade 26 in a reciprocating fashion with respect to the stationary blade 24.

At lateral ends of the blade set 22, so-called side protectors or lateral end bars 62, 64 are formed. In the exemplary embodiment shown in FIG. 2, the lateral end bars 62, 64 are molded to the stationary blade 24.

Being fitted with the swiveling mechanism 42 as exemplarily illustrated in FIG. 2 or with another exemplary embodiment of a swiveling mechanism, the cutting head 20 may be particularly suited for shaving operations. However, it is further preferred that the hair cutting appliance 10 is also suited for hair trimming operations. Hair trimming may involve cutting hairs at a desired length. The desired remaining length of the hairs may be defined by a so-called attachment comb. When attaching the attachment comb to the hair cutting appliance 10, it has to be considered that the blade set 22 is preferably pivotably mounted at the housing portion 12. At least in some embodiments as discussed herein, it is preferred that the contour-following feature is provided also in the comb mode when the attachment comb is mounted to the blade set 22.

In the following, exemplary embodiments of attachment combs for blade sets 22 will be elucidated and described in more detail. It goes without saying the single features disclosed in the context of a respective embodiment may be combined with any of the other embodiments, also in isolated fashion, thereby forming further embodiments that still fall under the scope of the present disclosure. Generally, the attachment combs may be referred to as skin protecting combs. In some embodiments, the attachment combs are arranged as spacing attachment combs. However, in some embodiments, the attachment combs do not or only slightly space the blade set away from the skin. In this exemplary configuration, a major purpose of the attachment comb is hair conditioning/lifting and skin protection.

Figure 3:
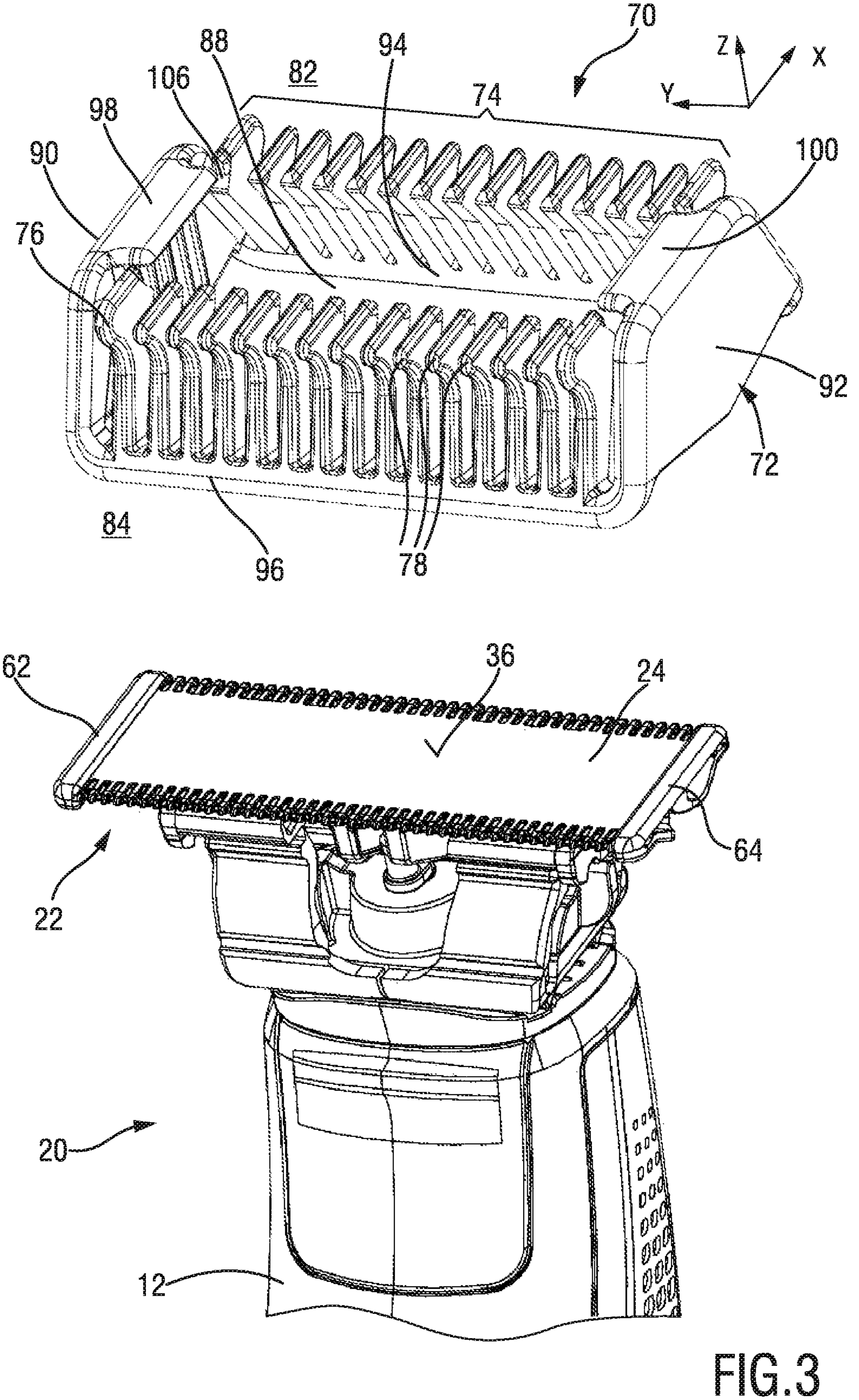
FIG. 3 shows a partial perspective top view of a cutting head of a hair cutting appliance and an attachment comb that may be attached thereto, wherein the attachment comb is shown in a detached state.

In FIG. 3, an attachment comb 70 is illustrated in a state detached from a cutting head 20 of a hair cutting appliance 10 as already explained in connection with FIG. 1 and FIG. 2. The comb 70 may also be referred to as skin protecting comb.

The comb 70 is arranged to be releasably attached to the blade set 22, as will be described in more detail hereinafter. The comb 70 comprises a supporting frame 72 from which comb teeth 74 extend. In the mounted state of the comb, the comb teeth 74 are oriented parallel to the teeth 38 of the stationary blade 24. It is preferred to have a non-uniform arrangement of the comb teeth. That is, differently shaped comb teeth 74 may be provided. The comb teeth 74 involve lateral teeth 76 (outer teeth) and central teeth 78. In the exemplary embodiment illustrated in FIG. 3, at respective outer lateral ends of the comb 70, lateral teeth 76 are provided. Between the lateral teeth 76, central teeth 78 are formed. Together, the lateral teeth 76 and the central teeth 78 form at least one series of teeth 82, 84. In the exemplary embodiment of FIG. 3, a first series 82 and a second series 84 is provided that are opposite to one another. The first series 82 and the second series 84 define therebetween a window or recess 88 for the blade set 22.

The supporting frame 72 of the comb 70 comprises a first lateral wall 90 and a second lateral wall 92. A linking bar 94 connects the lateral wall 90 and the lateral wall 92 at the side of the first series 82. A linking bar 96 connects the lateral wall 90 and the lateral wall 92 at the side of the second series 84.

The lateral walls 90, 92 define lateral ends of the supporting frame 72. The linking bars 94, 96 define longitudinal ends of the supporting frame 72. Together the lateral walls 90, 92 and the linking bars 94, 96 define a four-sided frame of the comb 70. The linking bars 94, 96 are arranged at a bottom end of the comb 70. At a top end of the comb 70, lateral lugs 98, 100 extend from the lateral walls 90, 92. The lateral lugs 98, 100 extend inwardly and face one another.

Figure 4:
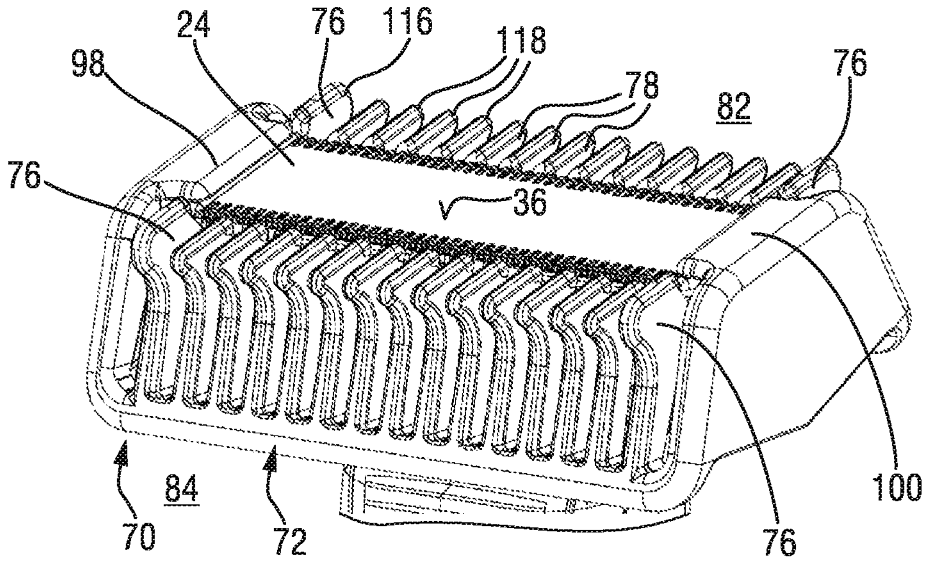
FIG. 4 is another view of the arrangement of FIG. 3 in an attached state of the attachment comb.
Figure 5:
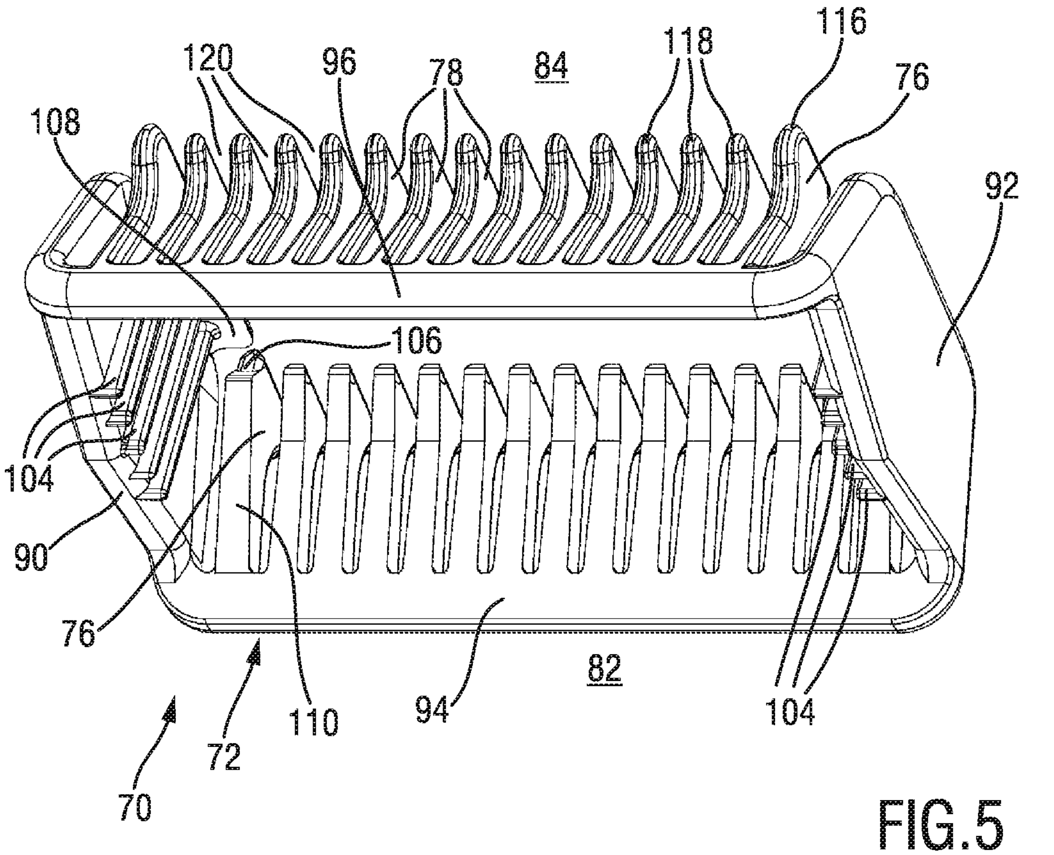
FIG. 5 is a perspective view of the attachment comb shown in FIGS. 3 and 4 in a bottom view.

Additional reference is made to the perspective views of FIG. 4 and FIG. 5. The view orientation of FIG. 4 is similar to the view orientation of FIG. 3, whereas in FIG. 4 the comb 70 is shown in the attached state. In FIG. 5, a perspective bottom view of the comb 70 is provided. As shown in FIG. 4, in the mounted state, the lateral lugs 98, 100 cover and retain the lateral end bars 62, 64 at the lateral ends of the blade set 22.

Further, as can be seen in FIG. 5, at the lateral walls 90, 92, inner guide ribs 104 are formed that define the lateral position (Y-position) of the blade set 22 in the mounted state. In the exemplary arrangement of FIG. 5, the guide ribs 104 extend in the vertical direction, for production/molding reasons.

At the lateral teeth 76 mounting surfaces 106 for the stationary blade 24 of the blade set 22 are formed at a rear top side thereof, refer to FIG. 3 and FIG. 5. At the lateral lugs 98, 100, mounting surfaces 108 are formed that are opposite to the mounting surfaces 106 at the lateral teeth 76, refer to FIG. 5. The mounting surfaces 106, 108 cooperate to retain and secure therebetween the stationary blade 24 of the blade set 22. Hence, the lateral teeth 76 and the lateral lugs 98, 100 jointly form snap-on mounting/locking features for the attachment of the comb 70 at the blade set 22. In the exemplary embodiment of FIGS. 3 to 5, the lateral teeth 76 are deflectable so that the stationary blade 24 may pass mounting ramps 110 at the rear sides of the lateral teeth 76, refer also to FIG. 6. Hence, the attachment comb 70 is easy to attach and easy to detach.

At the lateral teeth 76, tips 116 are formed. At the central teeth 78, tips 118 are formed. The tips 116, 118 of the teeth 76, 78 form a skin engagement zone when the comb 70 is moved along the skin in a movement direction in an orientation suitable for hair cutting. Between the teeth 76, 78, tooth slots 120 are present.

Figure 6:
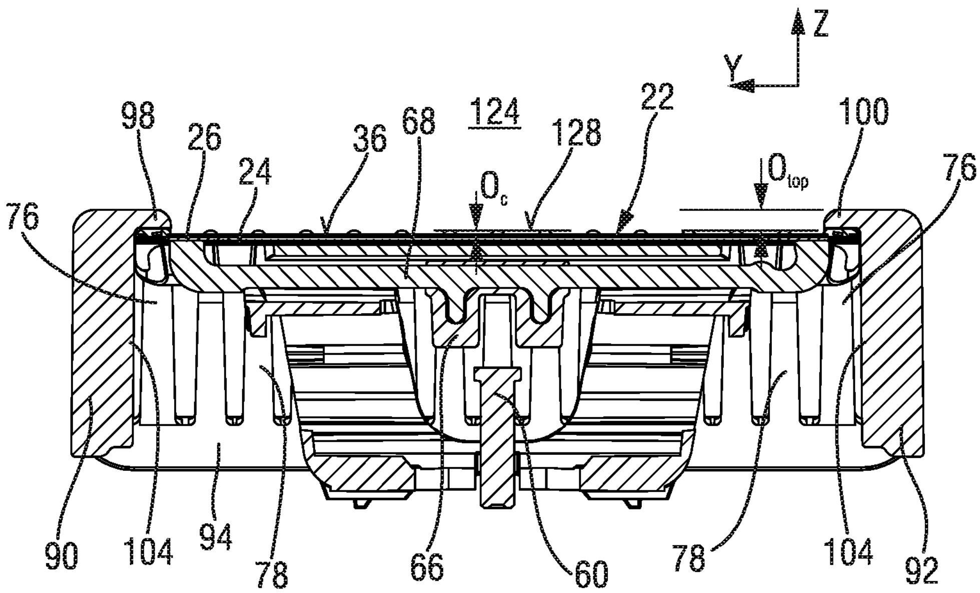
FIG. 6 is a cross-sectional front view of the attachment comb in a state attached to a blade set along the line VI-VI in FIG. 7.
Figure 7:
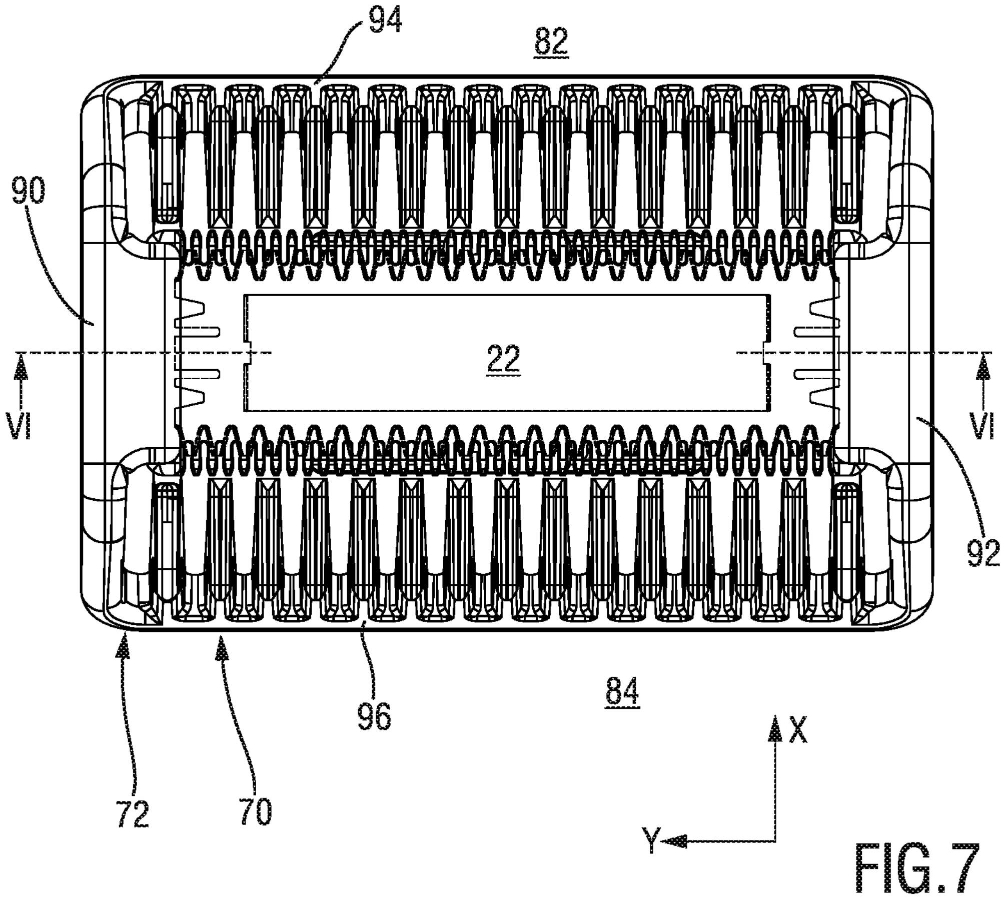
FIG. 7 is a top view of the arrangement of FIG. 6.

Additional reference is made to FIGS. 6 to 12, wherein FIG. 6 and FIG. 7 show the comb 70 in an attached state, and wherein any of FIGS. 8, 9, 10, 11 and 12 show the comb 70 in isolation.

Figure 8:
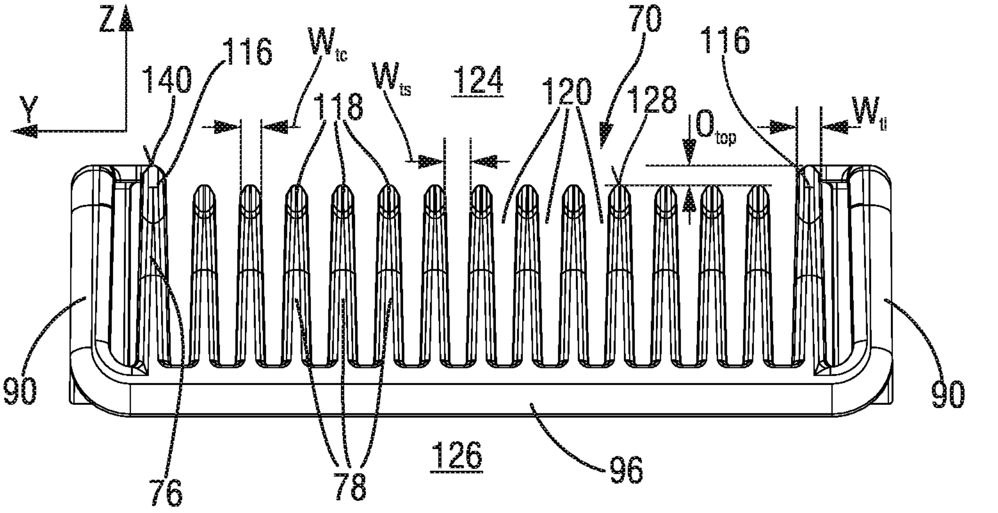
FIG. 8 is a front view of the attachment comb in isolation.

With reference to FIG. 8, a width of the lateral teeth 76 is indicated by $w_{tl}$. A width of the central teeth 78 is indicated by $w_{tc}$. Further, a width of the tooth slots 120 is indicated by $w_{ts}$. In the assembled state, the lateral lugs 98, 100 define a vertical limit stop for the blade set 22. More particularly, the stationary blade 24 of the blade set 22 is locked (in the Z-position) between mounting surfaces 106, 108 at the lateral lugs 98, 100 and the lateral teeth 76, as discussed herein before.

In FIG. 6, a top side of the comb 70 in the mounted state is indicated by 124. At the top side 124, the comb 70 faces and contacts the skin. In certain exemplary embodiments, the central teeth 78 slightly protrude beyond the top surface 36 of the stationary blade 24 in the vertical direction Z. The top surface 36 and the top surface 124 are not necessarily coincident. A respective offset is indicated in FIG. 6 by $o_c$. The offset $o_c$ from the top surface 36 of the stationary blade 24 ensures that primarily the top side 124 of the comb 70 and not necessarily the top surface 36 contacts the skin when the comb 70 is attached to the blade set 22. A bottom side of the comb 70 that is opposite to the top side 124 is indicated in FIG. 8 by 126. Further, in FIG. 8, a skin contact zone of the central teeth 78 is indicated by 128. A skin contact zone of the lateral teeth 76 is indicated by 140.

As shown in FIG. 6 and FIG. 8, the lateral teeth 76 protrude beyond the central teeth 78 in the vertical direction Z. A respective offset is indicated in FIG. 6 and FIG. 8 by $o_{top}$. The (vertical) offset $o_{top}$ between the skin contact zone 140 and 128 ensures that the lateral teeth 76 act as supporting teeth so that the contact pressure for the central teeth 78 is reduced.

Figure 9:
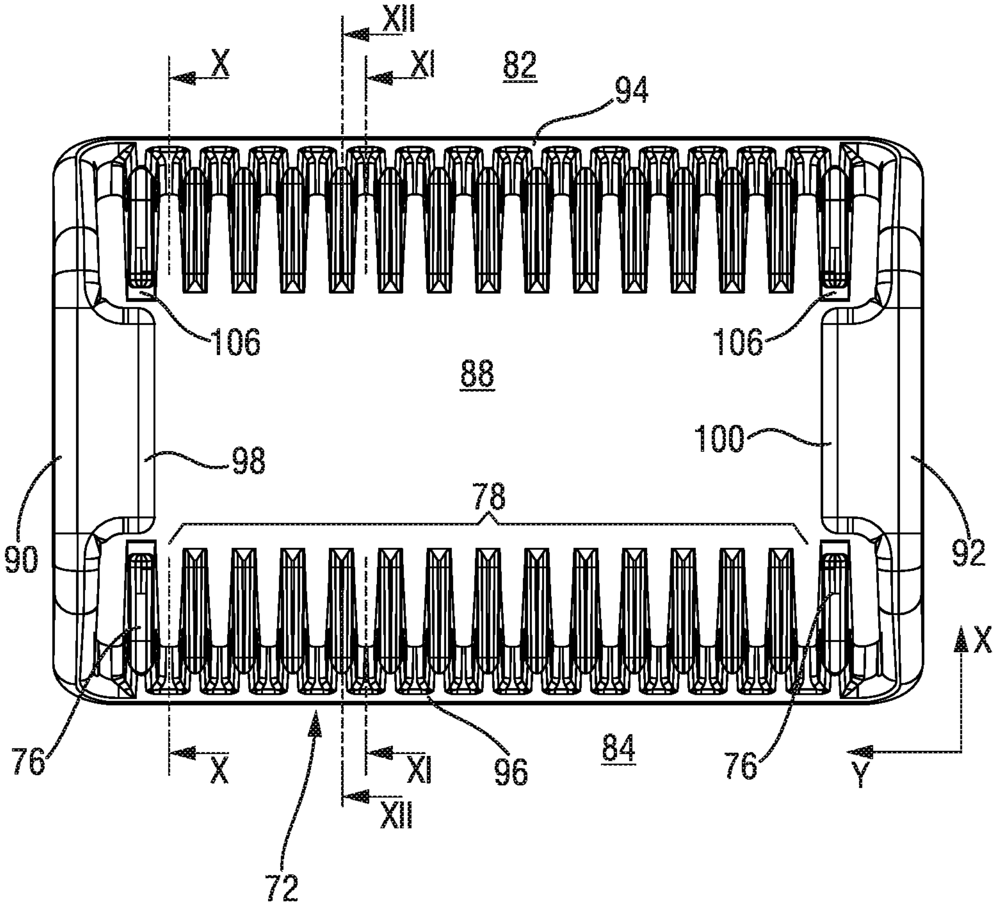
FIG. 9 is a top view of the attachment comb of FIG. 8.
Figure 10:
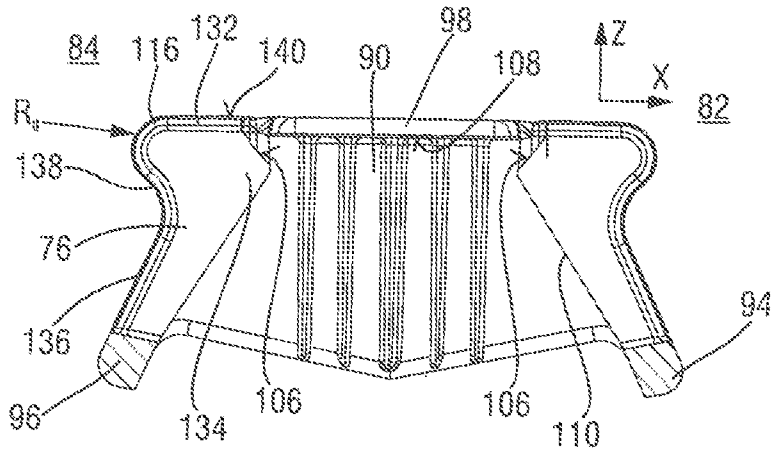
FIG. 10 is a cross-sectional side view along the line X-X in FIG. 9.
Figure 11:
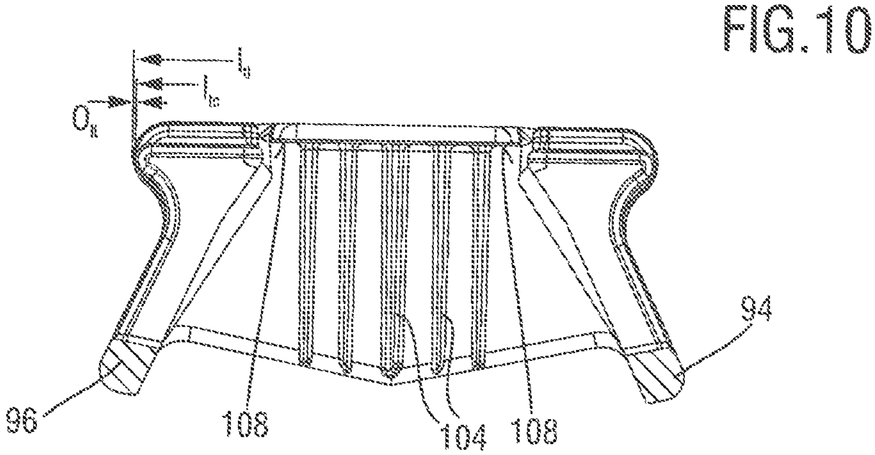
FIG. 11 is a cross-sectional side view along the line XI-XI in FIG. 9.
Figure 12:
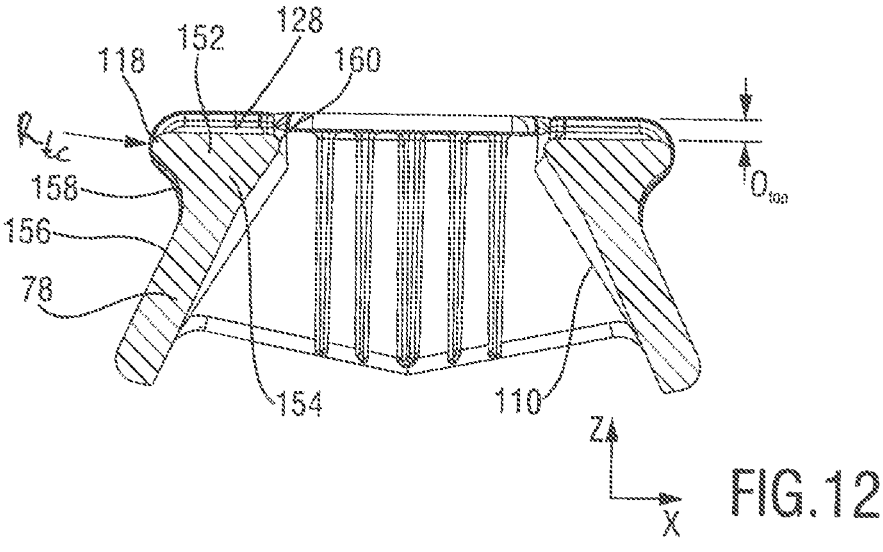
FIG. 12 is a cross-sectional side view along the line XII-XII in FIG. 9.

Further reference is made to the cross-sectional lateral views of FIG. 10, FIG. 11 and FIG. 12. Respective positions of the cross-sectional views are indicated in FIG. 9 by lines X-X, XI-XI, and XII-XII.

With reference to FIG. 10, the shape of the lateral teeth 76 is described in more detail. As already discussed further above, a mounting surface 106 of the lateral teeth 76 cooperates with a mounting surface 108 of the lateral lugs 98, 100 to retain therebetween the stationary blade 24 in the mounted state.

The lateral teeth 76 comprise a top side 132, a rear side 134, and a front side 136. The lateral teeth 76 extend from one of the linking bars 94, 96 in the vertical direction Z and the longitudinal direction X. The top side 132 defines the skin contact zone 140. The top side 132 connects the rear side 134 and the front side 136. The rear side 134 delimits the window or recess 88 for the stationary blade 24, refer to FIG. 9.

At the transition between the rear side 134 and the top side 132, the mounting surface 106 is formed. At the transition between the top side 132 and the front side 136, the tip 116 is formed. A tip radius is indicated by Rd. The tip 116 is convex in the view of FIG. 10. Adjacent to the tip 116, a concave curvature 138 is formed. As a consequence, the front side 136 of the lateral teeth 76 is somewhat S-shaped. Further, at the rear side 134, the mounting ramp 110 is formed.

With reference to FIG. 12, the shape of the central teeth 78 is described in more detail. The central teeth 78 comprise a top side 152, a rear side 154, and a front side 156. The central teeth 78 extend from the linking bars 94, 96 in the vertical direction Z and the longitudinal direction X. The top side 152 defines the skin contact zone 128. At the transition between the top side 152 and the rear side 154, a rear tip 160 is formed. The rear side 154 faces the window or recess 88, refer to FIG. 9. In the mounted state as shown in FIG. 7, the rear tip 160 forms a longitudinal limit stop for the stationary blade 24 of the blade set 22.

At a transition between the top side 152 and the front side 156, the tip 118 is formed. A tip radius is indicated in FIG. 12 by $R_{tc}$. The tip 118 is convex in the view of FIG. 12. Adjacent to the tip 118, a concave curvature 158 is formed at the front side 156. Overall, the front side 156 is somewhat S-shaped.

In FIG. 11, a longitudinal extension of the lateral teeth is indicated by $l_{tl}$. Similarly, a longitudinal extension of the central teeth is indicated by $l_{tc}$. A longitudinal offset between the lateral teeth 76 and the central teeth 78 is indicated by $o_{lt}$.

In combination, the offsets $o_{top}$ and $o_{lt}$ between the lateral teeth 76 and the central teeth 78 define a somewhat diagonal offset (in the vertical direction Z and the longitudinal direction X) therebetween. The upper and frontal contour of the tips 116 of the lateral teeth 76 protrudes beyond the upper and frontal contour of the tips 118 of the central teeth 78.

A further benefit of the design of the attachment comb 70 illustrated in FIGS. 3 to 12 is that the shape thereof may be formed in a relatively simple mold without additional sliders and/or further additional molding components. While the foregoing aspect is beneficial, this design shall not be interpreted in a limiting sense.

The design parameters presented herein describe the non-uniformity of the lateral teeth and the central teeth. More particularly, in accordance with the above described embodiments, the lateral teeth are more exposed but, at the same time, smoother than the central teeth.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An attachment comb for a blade set of a cutting head of a hair cutting appliance, the attachment comb comprising:

a supporting frame comprising opposite lateral walls and lateral lugs extending toward one another from the lateral walls in a lateral direction; and a plurality of comb teeth that are arranged in a series in the lateral direction attached to and extending from the supporting frame, wherein:

the plurality of comb teeth comprise two lateral teeth that respectively define outer lateral ends of the series and central teeth arranged between the lateral teeth, the lateral teeth have rounded lateral teeth tips, respectively, each comprising a lateral teeth tip radius of a curvature of the rounded lateral teeth tips when the lateral teeth are viewed in the lateral direction, the central teeth have rounded central teeth tips, respectively, each comprising a central teeth tip radius of a curvature of the rounded central teeth tips when the central teeth are viewed in the lateral direction, the lateral teeth tip radius of each of the lateral teeth is greater than the central teeth tip radius of each of the central teeth, the rounded lateral teeth tips and the rounded central teeth tips are configured to contact a skin of a user, each of the lateral teeth further comprises a front side facing outwardly in a longitudinal direction away from the supporting frame, a rear side facing inwardly in the longitudinal direction opposite to the front side, and a skin contact side connecting the front side and the rear side, wherein the longitudinal direction is perpendicular to the lateral direction, the rounded lateral teeth tip of each of the lateral teeth is convex and formed at a transition between the front side and the skin contact side, and a concave curvature adjoins the rounded lateral teeth tip along the front side of each of the lateral teeth, and the rear side defines a mounting surface configured to cooperate with the lateral lugs for attaching the attachment comb to the blade set of the cutting head of the hair cutting appliance.

2. The attachment comb as claimed in claim 1, wherein the lateral teeth tip radius is in a range of 1.0 mm to 2.5 mm, and wherein the central teeth tip radius is in a range of 0.25 mm to 0.8 mm.

3. The attachment comb as claimed in claim 1, wherein in a vertical direction perpendicular to the lateral and longitudinal directions, the lateral teeth protrude beyond the central teeth towards the skin contact side, and wherein the rounded lateral teeth tips are offset in the vertical direction with respect to the rounded central teeth tips.

4. The attachment comb as claimed in claim 1, wherein in the longitudinal direction, the lateral teeth protrude beyond the central teeth, wherein the rounded lateral teeth tips are offset in the longitudinal direction with respect to the rounded central teeth tips.

5. The attachment comb as claimed in claim 1, wherein a longitudinal extension of the lateral teeth is greater than a longitudinal extension of the central teeth in the longitudinal direction, wherein the longitudinal extension of the lateral teeth is 0.1 mm to 0.3 mm greater than the longitudinal extension of the central teeth, optionally 0.1 mm to 1.5 mm greater than the longitudinal extension of the central teeth.

6. The attachment comb as claimed in claim 1, wherein a width of the lateral teeth in the lateral direction is greater than a width of the central teeth in the lateral direction, wherein a ratio between the width of the lateral teeth and the width of the central teeth is greater than 1.0.

7. The attachment comb as claimed in claim 1, wherein tooth slots are formed between the plurality of comb teeth of the series, wherein the tooth slots have a width less than or equal to 1.5 mm.

8. The attachment comb as claimed in claim 1, wherein the supporting frame further comprises a linking bar extending between the lateral walls, and wherein the plurality of comb teeth attach to and extend from the linking bar.

9. The attachment comb as claimed in claim 1, wherein the plurality of comb teeth are further arranged in another series of comb teeth in the lateral direction attached to and extending from the supporting frame in the longitudinal direction opposite to the series of comb teeth, wherein the series of comb teeth and the another series of comb teeth define a recess for receiving the blade set of the hair cutting appliance.

10. The attachment comb as claimed in claim 1, wherein the lateral teeth tip radius is in a range of 1.5 mm to 1.8 mm, and wherein the central teeth tip radius is in a range of 0.35 mm to 0.7 mm.

11. The attachment comb as claimed in claim 1, wherein a longitudinal extension of the lateral teeth is greater than a longitudinal extension of the central teeth in the longitudinal direction, wherein the longitudinal extension of the lateral teeth is 0.1 mm to 1.5 mm greater than the longitudinal extension of the central teeth.

12. The attachment comb as claimed in claim 1, wherein a width of the lateral teeth in the lateral direction is greater than a width of the central teeth in the lateral direction, wherein a ratio between the width of the lateral teeth and the width of the central teeth is greater than 1.5.

13. A hair cutting appliance, comprising:

a housing portion; and a cutting head comprising a blade set comprising a stationary blade and a movable blade, wherein the stationary blade and the movable blade comprise at least one toothed leading edge jointly defined by teeth of the stationary blade and the movable blade, respectively, the teeth of the stationary blade and the movable blade extending in a longitudinal direction, wherein the stationary blade has a skin facing surface at the teeth arranged to face a skin of a user when in operation; and an attachment comb releasably mounted to the blade set, the attachment comb comprising:

a supporting frame attachable to the blade set of the cutting head; and a plurality of comb teeth that are arranged in a series in a lateral direction attached to and extending from the supporting frame, the lateral direction being perpendicular to the longitudinal direction, wherein:

the plurality of comb teeth comprise two lateral teeth that respectively define outer lateral ends of the series and central teeth arranged between the lateral teeth, the lateral teeth have rounded lateral teeth tips, respectively, each comprising a lateral teeth tip radius of a curvature of the rounded lateral teeth tips when the lateral teeth are viewed in the lateral direction, the central teeth have rounded central teeth tips, respectively, each comprising a central teeth tip radius of a curvature of the rounded central teeth tips when the central teeth are viewed in the lateral direction, the lateral teeth tip radius of each of the lateral teeth is greater than the central teeth tip radius of each of the central teeth, the rounded lateral teeth tips and the rounded central teeth tips are configured to contact the skin of the user, each of the lateral teeth further comprises a front side facing outwardly in the longitudinal direction away from the supporting frame, a rear side facing inwardly in the longitudinal direction opposite to the front side, and a skin contact side connecting the front side and the rear side, wherein the longitudinal direction is perpendicular to the lateral direction, the rounded lateral teeth tip of each of the lateral teeth is convex and formed at a transition between the front side and the skin contact side, and a concave curvature adjoins the rounded lateral teeth tip along the front side of each of the lateral teeth, and the rear side defines a mounting surface configured to cooperate with and secure the stationary blade of the blade set for mounting the blade set to the attachment comb.

14. The hair cutting appliance as claimed in claim 13, wherein the cutting head further comprises a swiveling mechanism that couples the blade set and the housing portion, wherein the attachment comb is arranged to be pivoted together with the blade set with respect to the housing portion.

15. The hair cutting appliance as claimed in claim 13, wherein the rounded lateral teeth tips and the rounded central teeth tips are configured to contact the skin at a position offset in a direction perpendicular to the lateral and longitudinal directions, from a surface of the stationary blade of the blade set.

16. The attachment comb as claimed in claim 15, wherein an offset value of the position offset in the vertical direction is greater than 0.05 mm.

* * * * *